(12) United States Patent
Khoshnevis

(10) Patent No.: US 7,841,849 B2
(45) Date of Patent: Nov. 30, 2010

(54) DRY MATERIAL TRANSPORT AND EXTRUSION

(75) Inventor: Behrokh Khoshnevis, Marina del Rey, CA (US)

(73) Assignee: University of Southern California, Los Angeles, CA (US)

( * ) Notice: Subject to any disclaimer, the term of this patent is extended or adjusted under 35 U.S.C. 154(b) by 261 days.

(21) Appl. No.: 11/556,048

(22) Filed: Nov. 2, 2006

(65) Prior Publication Data

US 2007/0138687 A1    Jun. 21, 2007

Related U.S. Application Data

(60) Provisional application No. 60/733,451, filed on Nov. 4, 2005, provisional application No. 60/820,046, filed on Jul. 21, 2006, provisional application No. 60/864,060, filed on Nov. 2, 2006, provisional application No. 60/744,483, filed on Apr. 7, 2006, provisional application No. 60/807,867, filed on Jul. 20, 2006.

(51) Int. Cl.
B29C 47/36    (2006.01)

(52) U.S. Cl. ............... 425/200; 425/206; 425/376.1

(58) Field of Classification Search ............ 366/64; 425/200, 206, 376.1, 471
See application file for complete search history.

(56) References Cited

U.S. PATENT DOCUMENTS

| | | | |
|---|---|---|---|
| 984,517 A | 2/1911 | Rollinger | |
| 1,578,511 A | 3/1926 | Gladwin | |
| 3,221,456 A | 12/1965 | Vevoda | |
| 3,464,676 A * | 9/1969 | Cox | 366/49 |
| 3,562,991 A | 2/1971 | Kustusch | |
| 3,966,533 A | 6/1976 | Goldsworthy | |
| 4,066,723 A | 1/1978 | King et al. | |
| 4,298,288 A * | 11/1981 | Weisbrod | 366/8 |
| 4,440,578 A * | 4/1984 | Wadia | 106/740 |
| 4,586,823 A * | 5/1986 | Schondorfer et al. | 366/3 |
| 4,833,855 A | 5/1989 | Winter, IV | |
| 4,850,382 A | 7/1989 | Williams | |
| 5,059,266 A | 10/1991 | Yamane et al. | |
| 5,529,471 A | 6/1996 | Khoshevis | |

(Continued)

FOREIGN PATENT DOCUMENTS

AT    385550    11/1988

(Continued)

OTHER PUBLICATIONS

Perry's Chemical Engineers' Handbook (7th edition), 1997, McGraw-Hill, 17-26,27 & 21-31.*

(Continued)

*Primary Examiner*—Joseph S Del Sole
*Assistant Examiner*—James Sanders
(74) *Attorney, Agent, or Firm*—McDermott Will & Emery LLP

(57) ABSTRACT

A process for making construction material may include mixing predetermined portions of two or more components of cementitious materials without ingredients that would allow the mixture to cure, and separating the un-curable mixture of the two or more components into a plurality of pellets, each having substantially the predetermined portions of the two or more components. An extrusion system may include a transport line configured to transport the dry pellets in a gaseous transport stream.

6 Claims, 3 Drawing Sheets

U.S. PATENT DOCUMENTS

| | | | |
|---|---|---|---|
| 5,617,515 | A | 4/1997 | MacLaren |
| 5,656,230 | A | 8/1997 | Khoshevis |
| 5,664,382 | A | 9/1997 | Melnick et al. |
| 5,749,196 | A | 5/1998 | Bangma |
| 6,001,181 | A | 12/1999 | Bullen |
| 6,103,161 | A | 8/2000 | Lopez |
| 6,170,220 | B1 | 1/2001 | Moore, Jr. |
| 6,363,683 | B1 | 4/2002 | Moore, Jr. |
| 6,423,261 | B1 | 7/2002 | Joseph et al. |
| 6,662,516 | B2 | 12/2003 | Vendehey et al. |
| 7,153,454 | B2 | 12/2006 | Khoshnevis |
| 2004/0099983 | A1 | 5/2004 | Dirscherl |
| 2004/0164436 | A1* | 8/2004 | Khoshnevis ................. 264/31 |
| 2005/0196482 | A1 | 9/2005 | Khoshnevis |
| 2009/0043424 | A1* | 2/2009 | Khoshnevis ............... 700/245 |

FOREIGN PATENT DOCUMENTS

| | | |
|---|---|---|
| GB | 892994 | 4/1962 |
| GB | 2267110 | 11/1993 |
| WO | WO 0242056 | 5/2002 |

OTHER PUBLICATIONS

EPO Examination Report for EPO Application No. 04704067.0, dated Aug. 7, 2009.

European Patent Office. Examination Report for EP Application No. 04 704 067.0, entitled "Multi-Nozzle Assembly for Extrusion of Wall," mailed Jan. 22, 2010.

Khoshnevis, B. et al. 2002. Automated Construction Using Contour Crafting: Applications on Earth and Beyond. International Symposium on Automation and Robotics in Construction, 19th (ISARC). Proceedings. National Institute of Standards and Technology, Gaithersburg, Maryland, Sep. 23-25, 2002, pp. 489-494.

* cited by examiner

DRY MATERIAL TRANSPORT AND EXTRUSION

CROSS-REFERENCE TO RELATED APPLICATIONS

This application is based upon and claims priority to U.S. Provisional Patent Application Ser. No. 60/733,451, entitled "Material Delivery Approaches for Contour Crafting," filed Nov. 4, 2005, U.S. Provisional Patent Application Ser. No. 60/820,046, entitled "Accumulated Design for Cementitious Material Delivery," filed Jul. 21, 2006, and U.S. Provisional Application Ser. No. 60/864,060, entitled "Metering and Pumping Devices," filed Nov. 2, 2006. The entire content of all three of these applications is incorporated herein by reference.

This application is also related to U.S. patent application Ser. No. 10/760,963, entitled "Multi-Nozzle Assembly for Extrusion of Wall," filed Jan. 20, 2004, which claims priority to and incorporates by reference U.S. Provisional Application Ser. No. 60/441,572, entitled "Automated Construction," filed Jan. 21, 2003. This application is also related to U.S. patent application Ser. No. 11/040,401, entitled "Robotic Systems for Automated Construction," filed Jan. 21, 2005, U.S. patent application Ser. No. 11/040,602, entitled "Automated Plumbing, Wiring, and Reinforcement," filed Jan. 21, 2005, and U.S. patent application Ser. No. 11/040,518, entitled "Mixer-Extruder Assembly," filed Jan. 21, 2005, all three of which claim priority to U.S. Provisional Application Ser. No. 60/537,756, entitled "Automated Construction Using Extrusion," filed Jan. 20, 2004. This application is also related to the following U.S. Provisional Applications: Ser. No. 60/730,560, entitled "Contour Crafting Nozzle and Features for Fabrication of Hollow Structures," filed Oct. 26, 2005; Ser. No. 60/730,418, entitled "Deployable Contour Crafting Machine," filed Oct. 26, 2005; Ser. No. 60/744,483, entitled "Compliant, Low Profile, Non-Protruding and Genderless Docking System for Robotic Modules," filed Apr. 7, 2006; and Ser. No. 60/807,867, entitled "Lifting and Emptying System for Bagged Materials," filed Jul. 20, 2006. This application is also related to U.S. patent application Ser. No. 11/552,741, entitled "Deployable Contour Crafting," filed Oct. 25, 2006, and U.S. patent application Ser. No. 11/552,885, entitled "Extruded Wall with Rib-Like Interior," filed Oct. 25, 2006. The entire content of all of these applications is incorporated herein by reference.

BACKGROUND

1. Field

This application relates to the construction of structures, such as buildings. More particularly, it relates to the construction of structures using extrusion techniques.

2. Description of Related Art

Structures, such as buildings, may be built up, layer by layer, by extruding cementitious or other unhardened material or materials from a nozzle moving in a controlled pattern. Examples of apparatuses and processes that may be used are set forth in the patent applications that have been incorporated by reference in the Cross-Reference to Related Applications section of this application.

This approach often involves the delivery of wet, uncured material, such as cementitious material, from a storage tank through one or more hoses to a nozzle. If there is a power failure, a lengthy halt in operation, or if the equipment is not adequately cleaned, the wet material may harden and interfere with further use of the equipment.

SUMMARY

An extrusion system may include a transport line configured to transport dry pellets in a gaseous transport stream. A mixing chamber may be included. The mixing chamber may have a dry pellets inlet configured to receive dry pellets delivered through the transport line, a fluid inlet configured to receive fluid, a mixer configured to mix the dry pellets with the fluid, and a wet material outlet configured to deliver wet material that includes the mixture of the dry pellets and the fluid. The extrusion system may include a nozzle having a nozzle inlet configured to receive the wet material and a nozzle outlet configured to extrude the wet material.

The mixer may have a chemical inlet configured to receive one or more chemicals. The mixer may be configured to mix the chemicals with the dry pellets and the fluid. The wet material outlet may be configured to deliver wet material that includes the mixed chemicals.

A separation chamber may be positioned above the mixer and have a separation chamber inlet configured to receive dry pellets from the transport line and a separation chamber outlet configured to deliver received dry pellets to the dry pellets inlet of the mixer.

The separation chamber may be configured to substantially separate the dry pellets from the gaseous transport stream.

The separation chamber may have a gaseous stream outlet and be configured to deliver the gaseous transport stream after the dry pellets have been substantially separated from it through the gaseous stream outlet.

The transport line may be a first transport line and the dry material transport system may include a second transport line configured to transport a gaseous stream substantially without dry pellets from the gaseous stream outlet of the separation chamber.

The separation chamber may be configured to substantially separate the dry pellets from the gaseous transport stream by making use of gravity.

The extrusion system may include a flow control valve between the separation chamber outlet and the dry pellets inlet of the mixer.

The extrusion system may include a wet material pump between the wet material outlet of the mixer and the nozzle inlet configured to pump wet material from the wet material outlet of the mixer to the nozzle inlet.

The wet material outlet may be at the bottom of the mixer.

Substantially each dry pellet may include two or more components of uncured cementitious material in substantially the same proportions as in the other dry pellets.

The mixing chamber may be a first mixing chamber and the extrusion system may include a second mixing chamber having a dry pellets inlet configured to receive dry pellets, a gas inlet configured to receive a gas, a mixer configure to mix the dry pellets with the gas, and an outlet configured to deliver the mixture of dry pellets and gas to the transport line. The extrusion system may include a tank configured to receive and store the dry pellets and that has an outlet configured to deliver stored dry pellets to the inlet of the second mixer.

An extrusion process may include transporting dry pellets in a gaseous transport stream, separating the dry pellets from the gaseous transport stream, mixing the separated dry pellets with fluid, and extruding the mixture of dry pellets and fluid.

The extrusion process may include mixing chemicals with the separated dry pellets and the fluid, and extruding the mixture of dry pellets, fluid and chemicals.

The extrusion process may include transporting the gaseous transport stream after the dry pellets have been separated from the gaseous transport stream.

The extrusion process may include mixing a gas with the dry pellets to form the dry pellets in the gaseous transport stream.

A plurality of dry construction pellets may each include two or more components of uncured cementitious material in substantially the same proportions as in the other dry pellets. The two or more components of uncured cementitious material may include the following three components: cement powder, sand, and gravel. The two or more components in each pellet may be held together by a non-reacting binder and/or a capsule. The dry construction pellets may each constitute extrudate.

A process for making construction material may include mixing predetermined portions of two or more components of cementitious materials without ingredients that would allow the mixture to cure, and separating the un-curable mixture of the two or more components into a plurality of pellets, substantially each pellet having substantially the predetermined portions of the two or more components. Each pellet may be formed by placing the two or more components into a capsule and/or by binding the two or more components into the pellet using a non-reacting binder. The process may include extruding the two or more components.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details that may be apparent or that are unnecessary are also often omitted to save space or for more effective illustration. When the same numeral appears in different drawings, it is intended to refer to the same or like components or steps.

DETAILED DESCRIPTION OF ILLUSTRATIVE EMBODIMENTS

Illustrative embodiments are now discussed. Other embodiments may be used in addition or instead. Details that may be apparent or that are unnecessary are also often omitted to save space or for more effective presentation.

Two or more components of uncured material, such as cementitious material, may be mixed in predetermined proportions. The components may consist of or include cement powder, sand, and/or gravel.

A non-reacting binder may be added to the mix. The non-reacting binder may be a small amount of water not sufficient to totally cure the cement, a polymer base binder, or any other liquid that can dissolve, disintegrate or be broken apart (and serve as filler material) in the presence of water. The resulting mixture may be extruded and broken into dried extrudate pellets.

Figure 1:
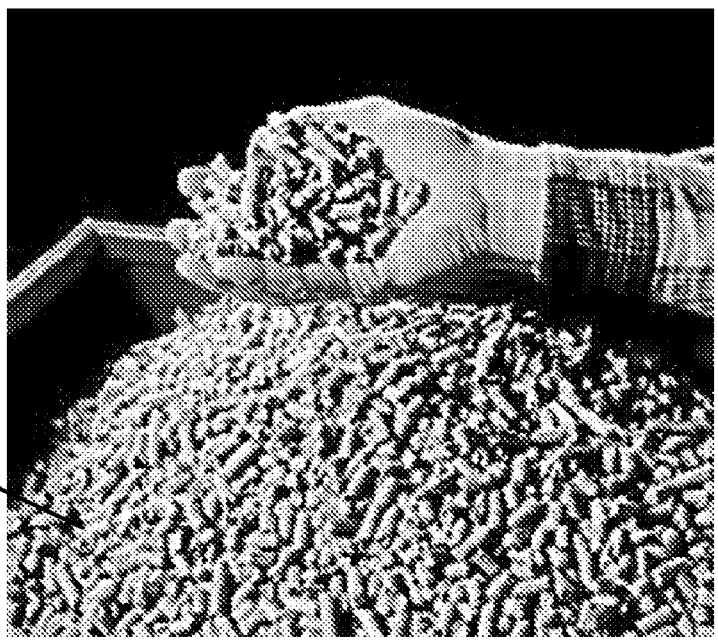
FIG. 1 illustrates uncured, extruded, dry construction pellets.

FIG. 1 illustrates uncured, extruded, dry construction pellets 101.

In lieu of or in addition to a non-reacting binder, a reacting binder may be added. With this approach, only a small amount of water and/or other fluid may be added, i.e., an amount sufficient to cause the mix to bind, but not sufficient to cause it to cure.

Figure 2:
FIG. 2 illustrates uncured, crushed, dry construction pellets.

In lieu of extrusion, the wetted mixture may instead be allowed to dry and then crushed into small pellets. FIG. 2 illustrates uncured, crushed, dry construction pellets 201.

In a still further embodiment, the mixture of construction materials may be placed in small capsules in a powder-like form be. An appropriate reactive or non-reactive binder may be included with the mixture that is placed within the capsules. The capsules may be made of a material that dissolves in a fluid, such as water. In addition or instead, the capsules may be made of a material that is easily crushed.

Whether using extrusion, crushing, and/or capsules, the process and apparatus that is employed may result in substantially all of the resulting pellets containing the desired construction materials in substantially the predetermined proportions.

Figure 3:
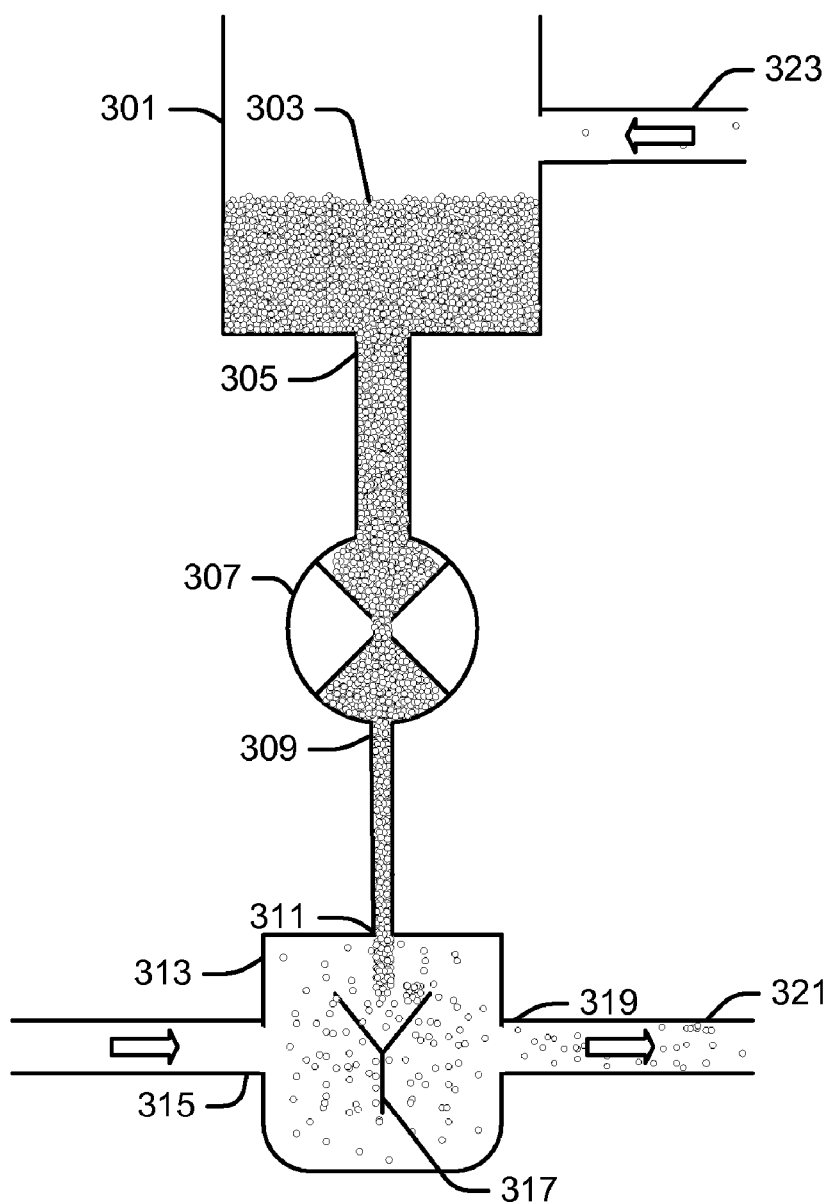
FIG. 3 illustrates an apparatus and process for injecting pellets into a gaseous transport stream.

FIG. 3 illustrates an apparatus and process for injecting pellets into a gaseous transport stream. As shown in FIG. 3, a tank 301 may be filled with a plurality of pellets 303. The pellets 303 may be any of the types of pellets that are described above and/or any other type or types of pellets.

A tank 301 may include an outlet 305, which may be anywhere on the tank, such as at the bottom of the tank, thus allowing the flow of particles through the outlet 305 to occur naturally under the force of gravity. A pump or other type of circulating device may be used in addition or instead.

The outlet 305 may allow the pellets 303 to feed into a flow control valve 307. The flow control valve 307 may be of any type and may be configured to controllably regulate the rate at which the pellets 303 may flow through it over a wide range.

The flow control valve 307 may have an outlet 309 from which flow-regulated pellets may be delivered to an inlet 311 of a mixing chamber 313. The mixing chamber 313 may be any type of mixing chamber. The mixing chamber 313 may have a gas inlet 315 into which a gas, such as air, may be delivered. The gas may be delivered to the gas inlet 315 under pressure or without additional pressure.

The mixing chamber 313 may have a rotating mixer 317 configured to mix the pellets that are channeled into the mixing chamber through the inlet 311 with the gas that is received at the inlet 315. Any other type of mixing device may be used in addition or instead. A gaseous stream containing the pellets may be delivered through an outlet 319 over a transport line 321.

Figure 4:
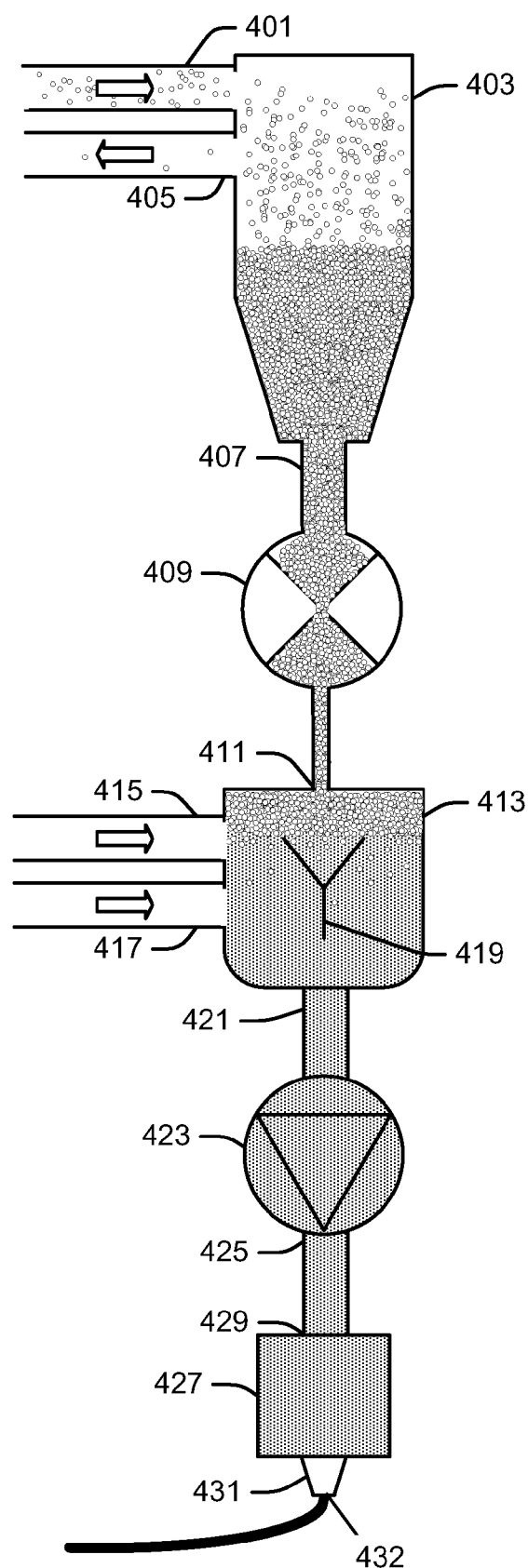
FIG. 4 illustrates an apparatus and process for transforming the gaseous transport stream of construction pellets illustrated in FIG. 3 into wet, cementitious extrudate.

FIG. 4 illustrates an apparatus and process for transforming the gaseous transport stream of construction pellets illustrated in FIG. 3 into wet, cementitious extrudate. As shown in FIG. 4, the gaseous transport stream of construction pellets may be delivered through an inlet 401 into a separation chamber 403. The separation chamber 403 may be configured to substantially separate the pellets from the gaseous stream, as illustrated in FIG. 4. The separation chamber 403 may be configured to make use of gravity, centrifugal force, and/or any other type of means to accomplish this separation.

As illustrated in FIG. 4, the valve 423 may be below, in vertical alignment with, and connected by a short tube to the wet mixing chamber 413 and configured to regulate the flow of wet, uncured, cementitious mixture of the dry pellets and the fluid from the wet mixing chamber 413; and the nozzle 427 may be below, in vertical alignment with, and connected by a short tube to the valve 423.

An outlet 405 in the separation chamber 403 may be provided through which the gaseous stream from which the construction pellets have been substantially removed may exit. This gaseous stream may be redirected back to an inlet 323 in the tank 301 so as to recycle any pellets that the separation chamber 403 failed to remove back into the tank 301 for later use. This may occur, for example, because the separation chamber 403 is filled to capacity.

Another outlet 407 in the separation chamber 403 may be provided through which separated pellets may flow. The outlet 407 may be in the bottom of the separation chamber 403, thus allowing the flow of particles through the outlet 407 to occur naturally under the force of gravity. A pump or other type of circulating device may be used in addition or instead.

The flow of separated particles from the separation chamber 403 may be regulated by a flow control valve 409. The flow control valve 409 may be configured to regulate the flow of pellets over a wide range. Any type of flow control valve may be used.

The regulated output of the flow control valve 409 may be directed into an inlet 411 of a mixing chamber 413. The mixing chamber 413 may be of any type. The mixing chamber may have one or more additional inlets, such as an inlet 415 and an inlet 417, configured to receive one or more materials that may be mixed with the pellets that are within the mixing chamber 413. For example, one or more admixture chemicals may be supplied to the inlet 415, such as a hardening agent, while a fluid, such as water, may be supplied to the inlet 417.

The mixing chamber 413 may be configured to mix the pellets that are delivered to the inlet 411 of the mixing chamber 413 with the materials that are delivered to the one or more other inlets of the mixing chamber 413, such as with admixture chemicals that are delivered to the inlet 415 and water that may be delivered to the inlet 417. The mixing chamber 413 may utilize a rotating mixer 419 for this purpose and/or any other type of mixing device.

The resulting mixture may be delivered through an outlet 421 of the mixing chamber 413 into a flow control valve 423. The flow control valve 423 may be of any type and may be configured to regulate the flow of the mixed material over a wide range. The regulated flow of the mixed material may be delivered through an outlet 425 of the flow control valve 423 into one or more inlets of a nozzle 427, such as an inlet 429.

The mixed and regulated material may be extruded through an outlet 432 in the nozzle 427.

Examples of nozzles and processes for using them are set forth in the patent applications that are incorporated by reference in the Cross-Reference to Related Applications section of this patent application.

A computer system may be used to partially or fully automate the operation of the valves 307, 409, and/or 423, the rotating mixers 317 and/or 419, the movement of the nozzle 427, and/or the extrusion of materials from the nozzle 427. In a partially automated mode, one or more of these devices may be manually controlled. In a fully automated mode, all of these devices may be controlled and operated by the computer system under the control of one or more computer programs. The same computer system, or a different computer system, may also operate a gantry or other form of robotic system that may be used to move the nozzle 427 in a controlled pattern while material is extruded from it and/or a deployable machine that may be used to transport the nozzle, along with the gantry system, to a construction site. Examples of apparatuses and processes that may be used in association with the apparatuses and processes described in this application are set forth in the patent applications that are incorporated by reference in the Cross-Reference to Related Applications section of this patent application.

The components, steps, features, objects, benefits and advantages that have been discussed are merely illustrative. None of them, nor the discussions relating to them, are intended to limit the scope of protection in any way. Numerous other embodiments are also contemplated, including embodiments that have fewer, additional, and/or different components, steps, features, objects, benefits and advantages. The components and steps may also be arranged and ordered differently.

For example, one or more of the flow control valves 307, 409, and 423 may not be used. In addition or instead, additional flow control valves may be used in other areas of the system. Although gravity has been advantageously used in connection with the flow of material in several areas of the system, one or more of these flows may be effectuated through the application of other types of force or forces.

Although only a single extrusion outlet 431 is illustrated in FIG. 4, the nozzle 427 may be configured with several extrusion outlets. The nozzle 427 and/or the mechanisms that feed it may be configured to cause two or more of these outlets to extrude material simultaneously and/or or sequentially. Again, reference is made to the patent applications that are incorporated by reference in the Cross-Reference to Related Applications section of this patent application for examples.

The phrase "means for" when used in a claim embraces the corresponding structures and materials that have been described and their equivalents. Similarly, the phrase "step for" when used in a claim embraces the corresponding acts that have been described and their equivalents. The absence of these phrases means that the claim is not limited to any of the corresponding structures, materials, or acts or to their equivalents.

Nothing that has been stated or illustrated is intended to cause a dedication of any component, step, feature, object, benefit, advantage, or equivalent to the public, regardless of whether it is recited in the claims.

In short, the scope of protection is limited solely by the claims that now follow. That scope is intended to be as broad as is reasonably consistent with the language that is used in the claims and to encompass all structural and functional equivalents.

I claim:

1. A cementitious material extrusion system comprising:
    a tank configured to store dry pellets of uncured cementitious material;
    a dry pellets outlet from the tank configured to deliver dry pellets from within the tank;
    a dry mixing chamber connected to the dry pellets outlet configured to receive dry pellets from the dry pellets outlet;
    a gas inlet to the dry mixing chamber configured to receive a gaseous transport stream;
    a mixer within the dry mixing chamber configured to mix the dry pellets received by the dry mixing chamber with the gaseous transport stream received by the dry mixing chamber;
    a gas/dry pellets outlet from the dry mixing chamber configured to deliver the mixture of the gaseous transport stream with the dry pellets from the dry mixing chamber;
    an outgoing transport line connected to the gas/dry pellets outlet from the dry mixing chamber configured to deliver the mixture of the gaseous transport stream with the dry pellets to a remote location;

a separation chamber configured to separate dry pellets from a mixture of a gaseous transport stream with dry pellets and to store a quantity of the separated dry pellets;

a gas/dry pellets inlet to the separation chamber connected to the outgoing transport line configured to receive the mixture of the gaseous transport stream with the dry pellets and to deliver the mixture into the separation chamber;

a dry pellets outlet from the separation chamber configured to deliver dry pellets separated by the separation chamber from the mixture of the gaseous transport stream with the dry pellets;

a wet mixing chamber connected to the dry pellets outlet from the separation chamber configured to receive the dry pellets from the dry pellets outlet from the separation chamber;

a fluid inlet to the wet mixing chamber configured to receive a fluid;

a mixer within the wet mixing chamber configured to mix the dry pellets received by the wet mixing chamber with the fluid received by the wet mixing chamber;

a wet cementitious material outlet from the wet mixing chamber configured to deliver a wet, uncured, cementitious mixture of the dry pellets and the fluid from the wet mixing chamber;

a valve below, in vertical alignment with, and connected by a short tube to the wet mixing chamber and configured to regulate the flow of the wet, uncured, cementitious mixture of the dry pellets and the fluid from the wet mixing chamber;

a computer-controlled nozzle below, in vertical alignment with, and connected by a short tube to the valve and configured to receive and extrude the wet cementitious mixture of the dry pellets and the fluid;

an overflow outlet from the separation chamber configured to vent the gaseous transport stream delivered by the gas/dry pellets inlet to the separation chamber mixed with the dry pellets which were also delivered by the gas/dry pellets inlet, but which failed to be separated by the separation chamber from the gaseous transport stream;

a return transport line connected to the overflow outlet from the separation chamber configured to deliver the mixture of the gaseous transport stream and the overflow dry pellets from the overflow outlet to the tank;

an overflow inlet to the tank connected to the return transport line configured to receive the gaseous transport stream mixed with the overflow dry pellets and to deposit the overflow pellets in the tank; and wherein the separation chamber, the overflow outlet from the separation chamber, the tank, and the overflow inlet to the tank are configured to cause the supply of dry pellets to the wet mixing chamber to be automatically replenished during operation of the cementitious material extrusion system without overflow of the separation chamber.

2. The extrusion system of claim 1 wherein:

the wet mixer also has a chemical inlet configured to receive one or more chemicals;

the wet mixer is configured to mix the chemicals with the dry pellets and the fluid; and the wet cementitious material outlet is configured to deliverer the wet cementitious mixture with the mixed chemicals.

3. The extrusion system of claim 1 wherein the separation chamber is configured to substantially separate the dry pellets from the gaseous transport stream by making use of gravity.

4. The extrusion system of claim 1 further comprising a dry pellets flow control valve between the dry pellets outlet from the separation chamber and the wet mixing chamber.

5. The extrusion system of claim 1 wherein the wet, uncured, cementitious material outlet is at the bottom of the wet mixing chamber.

6. The extrusion system of claim 4 wherein the separation, chamber, the dry pellets flow control valve, and the wet mixing chamber are oriented with respect to one another and configured so as to cause dry pellets that are separated by the separation chamber to flow from the separation chamber through the dry pellets flow control valve and into the wet mixing chamber solely under the force of gravity.

\* \* \* \* \*